United States Patent [19]

Ackerson et al.

[11] Patent Number: 4,801,421
[45] Date of Patent: Jan. 31, 1989

[54] ON-LINE MONITORING AND ANALYSIS OF REACTOR VESSEL INTEGRITY

[75] Inventors: D. Scott Ackerson, West Chester; Albert J. Impink, Jr., Murrysville Boro; Kenneth R. Balkey, Churchill Boro; Timothy S. Andreychek, Whitehall Boro, all of Pa.

[73] Assignee: Westinghouse Electric Corp., Pittsburgh, Pa.

[21] Appl. No.: 26,501

[22] Filed: Mar. 16, 1987

Related U.S. Application Data

[63] Continuation-in-part of Ser. No. 741,088, Jun. 4, 1985, abandoned.

[51] Int. Cl.$^4$ .............................................. G21C 17/00
[52] U.S. Cl. ...................................... 376/249; 376/247
[58] Field of Search ............... 376/247, 249, 254, 255, 376/259; 364/527

[56] References Cited

U.S. PATENT DOCUMENTS

| | | | |
|---|---|---|---|
| 4,370,889 | 2/1983 | Ruthrof et al. | 376/249 |
| 4,384,793 | 5/1983 | O'Brien | 376/247 |
| 4,440,509 | 4/1984 | Agarwal | 376/247 |
| 4,483,631 | 11/1984 | Kydd | 376/247 |
| 4,552,718 | 11/1985 | Impink, Jr. et al. | 376/245 |
| 4,764,882 | 8/1988 | Braschel | 376/249 |

FOREIGN PATENT DOCUMENTS 0088572  9/1983  European Pat. Off. .
58-134313 10/1983  Japan .

OTHER PUBLICATIONS

Method for Fracture Mechanics Analysis of Nuclear Reactor Vessels Under Severe Thermal Transients, C. B. Buchalet et al., 8/75.
Fracture Mechanics Evaluation of Heating the Refueling Water Storage Tank for the H. B. Robinson Reactor Vessel Beltline Following a Postulated Small Loca Transient, P. L. Turner et al., Required $RT_{NDT}$ Analysis—T. A. Meyer et al., 4/83.

Primary Examiner—Deborah L. Kyle
Assistant Examiner—Daniel Wasil
Attorney, Agent, or Firm—D. C. Abeles

[57] ABSTRACT

A real time analysis of nuclear reactor vessel integrity is preformed by monitoring reactor coolant temperature and pressure and fast neutron fluence, and generating therefrom a visual comparison of the reference nil-ductility transition temperature, $RT_{ndt}$, required for flaw initiation and the actual $RT_{ndt}$ through the entire depth of the vessel wall at selected critical locations. When flaw initiation is indicated at any depth, the $RT_{ndt}$ required for flaw propagation arrest is also generated and displayed. A display can also be generated to provide guidance for optimum performance during heatup and cooldown. Thermocouples located at the reactor core inlet are used in conjunction with the resistance temperature detectors, RTDs, conventionally provided in the cold leg conduits to generate a more accurate measurement of the coolant temperature at the critical locations in the vessel. Under stagnant flow conditions a correlation is applied to the RTD readings to provide the best estimate of coolant temperature at the critical locations.

29 Claims, 9 Drawing Sheets

ON-LINE MONITORING AND ANALYSIS OF REACTOR VESSEL INTEGRITY

RELATED APPLICATION

This is a continuation-in-part of U.S. patent application Ser. No. 06/741,088 filed on June 4, 1985, now abandoned.

BACKGROUND OF THE INVENTION

1. Field of the Invention

This invention relates to a method and apparatus for monitoring and analyzing on an on-line basis the integrity of fluid containing vessels, and particularly nuclear reactor vessels, during both normal and abnormal fluid temperature and pressure transients. More particularly, the invention is directed to presenting to a plant operator a visual representation of the margin between the reference nil-ductility transition temperatures required for crack initiation and arrest, and the actual reference nil-ductility transition temperature through the entire thickness of the vessel at selected critical points taking into account, in the case of reactor vessels, the effects of radiation embrittlement. The invention also encompasses techniques for providing accurate determinations of reactor coolant temperature at critical locations in a nuclear reactor pressure vessel, even during injections for core cooling purposes of cold coolant water under stagnant flow conditions.

2. Background Information

The pressure vessel in which the core of a nuclear reactor is housed is subjected throughout its nominal 40 year life to stresses induced by changes in reactor coolant temperature and pressure. During normal operations, these stresses are of moderate rate and amplitude and have no significant adverse affect on the vessel which is designed with a large safety margin to withstand the expected loading. These normal operations include heat up and cool down where restrictive schedules are rigorously followed to maintain the stresses within prescribed limits.

During some abnormal operations, such as a loss of coolant accident (a LOCA), temperature and/or pressure transients which far exceed those which occur during normal operations may be experienced. Though some abnormal events may not impose serious stresses on the vessel themselves, corrective action taken to alleviate the initial problem, such as injecting cold water into the reactor, may lead to transients which could be a threat to vessel integrity.

The reactor pressure vessel is a cylindrical enclosure with hemispherical ends which is fabricated from steel plates welded along longitudinal and circumferential seams. The upper hemispherical end, or head, is removable for access to the internals. Inlet and outlet nozzles, for each reactor coolant loop, typically 2 to 4 in a pressurized water reactor, are welded into the vessel walls. Typically, it is the welds where flaws are likely to be found which can develop into cracks under the stress induced by large thermal transients. The problem is compounded, in general, by embrittlement of the metal by the neutron radiation to which the vessel is subjected and is of most concern with regard to the welds at the level of the reactor core where the fluence is the highest.

It is necessary for the operator of a nuclear power plant to be constantly aware of the status of the reactor pressure vessel with respect to non-ductile failure. Presently, the operator has two means of obtaining this status: standard heatup/cooldown curves and the recently developed status tree approach. The heatup/cooldown curves define the allowable pressure and temperature domain and are mandated by the Nuclear Regulatory Commission for use during normal startup and shutdown of the reactor. These curves are generated in accordance with Appendix G of Section III of the American Society of Mechanical Engineers Boiler and Pressure Vessel Code (A.S.M.E. code). They can also be utilized during an abnormal event to determine if the temperature and pressure transients remain within the limits established by the curves. The status tree approach, which was developed expressly to assess vessel integrity during pressurized thermal shock events, assumes a step change in temperature to provide a worst case scenerio and through the application of off-line fracture mechanics analysis establishes pressure and temperature boundaries for a particular plant and provides instructions for actions to be taken as the boundaries are approached or exceeded.

Both of these presently available methods of determining vessel integrity status are limited in the following ways: (1) they utilize a quasi-time dependent approach to determining vessel status, when in fact the fracture mechanics problem is a very time dependent function of both vessel temperature and pressure, which requires the introduction of excessive, unquantifiable conservatism into the status information since the operator is not provided with accurate knowledge of the actual margin to flaw initiation in the vessel wall as the plant is stabilized and recovered from a cooldown transient; (2) both methods use cold leg resistance temperature detector (RTD) temperatures as the indicator of current reactor vessel temperature thereby introducing uncertainties into the measurements, and rendering the determined status potentially imprecise, particularly in the event of thermal stratification as a result of safety injection flow under stagnant loop conditions; and (3) both methods require operator interpretation of the cooldown history in order to provide a status, which is a time consuming and subjective task that must be performed, at times, under accident conditions.

Under present practice, the NRC requires that if the heatup/cooldown curve limits are exceeded during a thermal transient, an analysis must be performed before the conditions have occurred which could cause potential flaws to be initiated in the vessel. Such an analysis is performed after the fact and can cause a delay in returning the unit to power where the results indicate that critical conditions were not reached. Of course, if the analysis indicates that critical conditions had existed, then detailed inspections and/or repairs may have to be performed.

In the post event analysis of an abnormal plant transient, data from the event are used to construct temperature and the resulting stress profiles through the vessel at selected critical locations. Through the application of fracture mechanics analysis the stress profile is used to calculate how close the vessel may have come to non-ductile failure. Specifically, the procedure postulates flaws of varying depth at the critical location and calculates for each such flaw the margin between the stress intensity factor and both the fracture initiation toughness and arrest toughness of the material calculated as a function of the actual reference nil-ductility transition temperature $RT_{ndt}$, which in turn, is a function of the condition of the material and the fluence. If these margins for all of the postulated flaws meet preset limits, it is assumed that no damage was caused by the transient. Application of such post event fracture mechanics analysis of thermal shock events is discussed in a paper entitled "Method for Fracture Mechanics Analysis of Nuclear Reactor Vessels Under Severe Thermal Transients", by C. B. Buchalet and W. H. Bamford and published by the American Society of Mechanical Engineers, 1975.

The results of such after the fact facture mechanics analysis have been cross-checked at times by required $RT_{ndt}$ analysis. In this analysis, the required $RT_{ndt}$ for crack initiation is determined by finding what the $RT_{ndt}$ would have to be to make the fracture toughness for crack initiation equal to the stress intensity factor for various depth cracks through the vessel wall. The required $RT_{ndt}$ for crack arrest is determined in a similar manner using the fracture toughness for arrest. Plots of the required $RT_{ndt}$ for crack initiation and arrest are overlayed with a plot of the actual $RT_{ndt}$ to determine if there are any locations where the actual $RT_{ndt}$ exceeds the required $RT_{ndt}$ and at what depths such crack propagation would arrest. As mentioned, such required $RT_{ndt}$ analysis has been used previously as a check on the after the fact analysis performed in accordance with the techniques set forth in the Buchalet et al paper. It has also been used as an analytical tool to determine what the effect would be of raising the temperature of the normally ambient temperature injection water.

In any analysis of vessel integrity, the actual transient to which the vessel is exposed is crucial. The pressure transient is readily available; however, the temperature transient at the critical locations such as at welds in the vessel beltline, is much more difficult to determine, especially where cold safety injection water is introduced under stagnant flow conditions. Since it is not practical to place temperature sensors at such locations, other means must be utilized. As mentioned above, a conservative approach is to assume a step change to the temperature of the safety injection water, but this can lead to the plant operator addressing vessel integrity, when it is not important, and the operator should be addressing other more important critical safety functions at that time. A more recent approach is the mixing cup analysis which utilizes data generated from one-fifth scale vessel model tests conducted at Creare Research Laboratories. This analysis utilizes a mathematical model of a selected volume of the reactor coolant system to analytically determine the mixed mean temperature at the core midplane in the downcomer. While this method has been successfully used in after the fact analysis of events, it has not been adapted to on-line determination of beltline temperature due primarily to the difficulty in defining the boundary conditions in real time.

It is a primary object of the present invention to provide an accurate, easily understood, on-line, real-time representation of the integrity status of a vessel containing a fluid subject to varying temperature and pressure conditions and especially the pressure vessel of a nuclear reactor.

It is also an object of the invention to achieve the above through improved accuracy in determining the temperature of the reactor coolant adjacent the critical locations in the pressure vessel even during safety injection under stagnant flow conditions.

It is another object of the invention to realize the first objective through generation of a display which presents the operator with a real-time visual indication of the current margin to non-ductile failure for selected critical pressure vessel locations.

SUMMARY OF THE INVENTION

In accordance with the invention, an on-line, real-time fracture mechanics analysis of a vessel containing a fluid subjected to varying temperature and pressure conditions is achieved by monitoring the fluid temperature and pressure and generating therefrom real-time represenations of the margin to on-ductile failure at selected critical points in the vessel for all flaw depths of interest through the vessel wall. More particularly, a distribution through the vessel wall of the reference nil-ductility transition temperature ($RT_{ndt}$) required for flaw initiation as a result of transients in the fluid temperature and pressure is generated and displayed together with a distribution of the actual $RT_{ndt}$ to provide a visual comparison of the two parameters. The spacing between the displayed actual $RT_{ndt}$ and required $RT_{ndt}$ distributions provides the visual indication of the margin to non-ductile failure across the entire depth of the vessel wall at each critical location. When the required $RT_{ndt}$ for flaw initiation intersects the actual $RT_{ndt}$ at any depth, indicating conditions for flaw initiation exist, a distribution of the required $RT_{ndt}$ for flaw propagation arrest is generated and displayed along with the required $RT_{ndt}$ for flaw initiation and actual $RT_{ndt}$ to provide a real-time visual display of the depth at which such a running flaw, if it existed, should terminate. The required $RT_{ndt}$s are generated by generating signals representative of the real time stress intensity factor attributable to transients in the fluid temperature and pressure, and signals representative of the real time fracture initiation toughness, or the arrest toughness as appropriate, and determining the $RT_{ndt}$ at which the stress intensity factor equals the fracture initiation or arrest toughness across the depth of the vessel wall.

As applied to nuclear reactors, the fast neutron fluence is also monitored on a continuous, on-line basis and used in generating the $RT_{ndt}$s to take into account the effects of radiation embrittlement. Any other factors affecting the actual $RT_{ndt}$s of the vessel over time could be similarly monitored and taken into account.

The invention is also directed to providing a more accurate determination of the temperature of the coolant at the critical locations in a reactor pressure vessel. The temperature is measured in the cold leg conduit and at the reactor core inlet, in other words, before and after it circulates past the critical locations in the vessel wall. These temperature readings are taken for each reactor coolant loop and analyzed to determine flow conditions. Readings within preset narrow limits indicate normal forced flow and the two measurements are merely averaged for the best determination of the coolant temperature along the vessel wall. Large differences in the temperature readings at the two locations indicate stagnant flow in the associated loop. Under these conditions, a correlation which relates measured temperature to actual temperature at the vessel wall is applied to the measured temperature.

By applying appropriate safety factors to the pressure readings and to the fracture toughness, the invention can be used to provide a visual guide for efficient performance during normal heatup and cooldown events. Should the optimum performance profile be inadvertently exceeded, vessel integrity analysis is immediately available to determine if a threat to vessel integrity was actually posed.

In addition to providing the operator with a clear, unambigous visual display based upon an in-depth, real-time analysis of vessel integrity, recommendations can also be provided to the operator for a suitable response when the analysis determines that vessel integrity was threatened.

The present invention encompasses both method and apparatus for carrying out the above functions.

BRIEF DESCRIPTION OF THE DRAWINGS

A full understanding of the invention can be gained from the following description read in conjunction with the attached drawings in which.

DESCRIPTION OF THE PREFERRED EMBODIMENT

Figure 1:
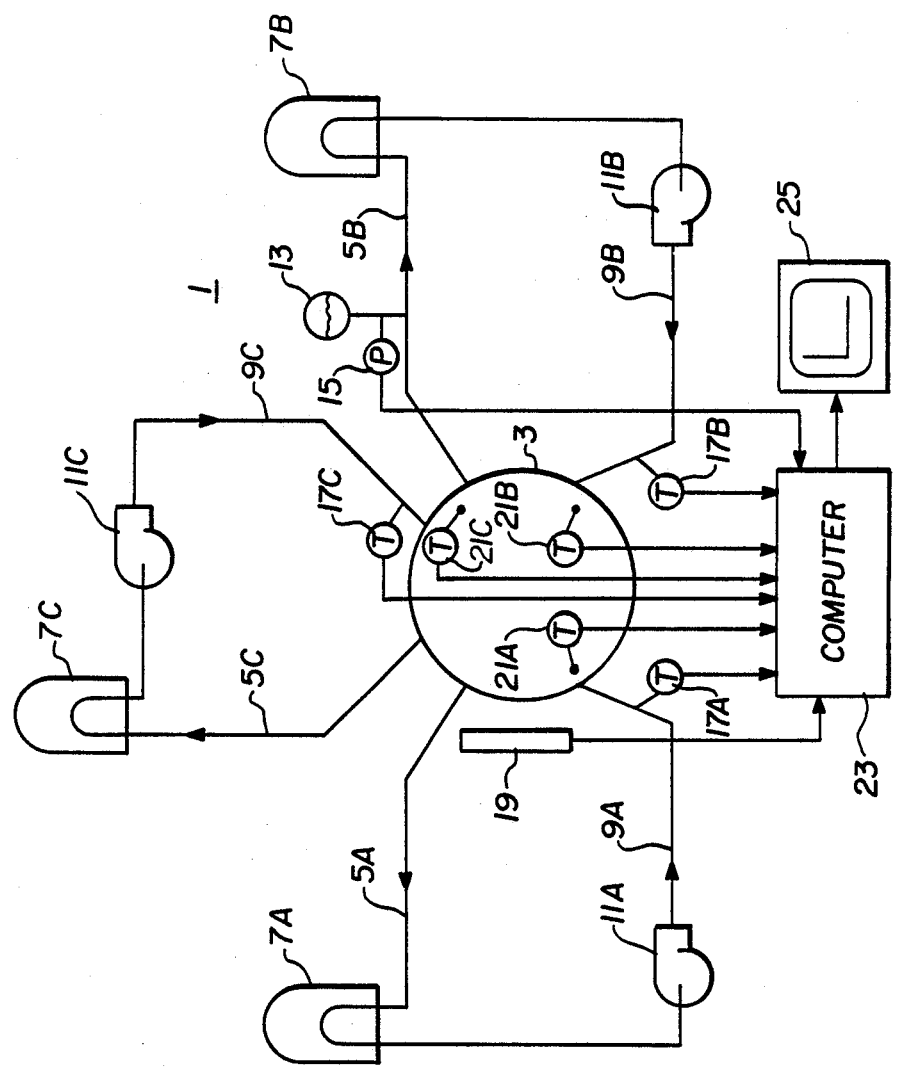
FIG. 1 is a schematic diagram of a nuclear reactor coolant system to which the invention has been applied.

FIG. 1 illustrates schematically the application of the invention to the nuclear steam supply system 1 of a pressurized water reactor (PWR), but it is to be understood that the invention can be applied to other reactor systems also and even to other vessels or conduits containing fluid which is subjected to varying temperature and pressure conditions. The system shown in FIG. 1 is a three loop PWR which includes a reactor 3 in which fission reactions are promoted at a controlled rate to generate heat energy. Reactor coolant in the form of light water is circulated through the reactor to absorb that heat generated by the fission reactions and is passed through hot leg conduits 5 in the three loops A, B, and C to heat exchangers in the form of stem generators 7 where the heat energy carried by the coolant generates steam in secondary loops (not shown) for use in driving a turbine-generator combination which produces electric power. The coolant is returned to the reactor 3 from the steam generators 7 through cold leg conduits 9A, 9B and 9C by reactor coolant pumps 11A, 11B and 11C. A pressurizer 13 regulates reactor coolant pressure which is typically about 2250 psi with the reactor at normal operating temperature. The present invention utilizes reactor coolant pressure as measured by pressure transducer 15, cold leg temperatures as measured by resistance temperature detectors 17 and neutron flux as measured by detector 19 all of which form a part of the conventional reactor control, monitoring and protection systems. One aspect of the present invention also utilizes thermocouples 21 which measure reactor core inlet temperatures. All of these measurements are processed by a general purpose digital computer 23 which performs the functions discussed below and generates visual displays for presentation on display device 25. The computer 23 may be the plant computer currently used for monitoring purposes or can be a separate, dedicated unit.

Figure 2:
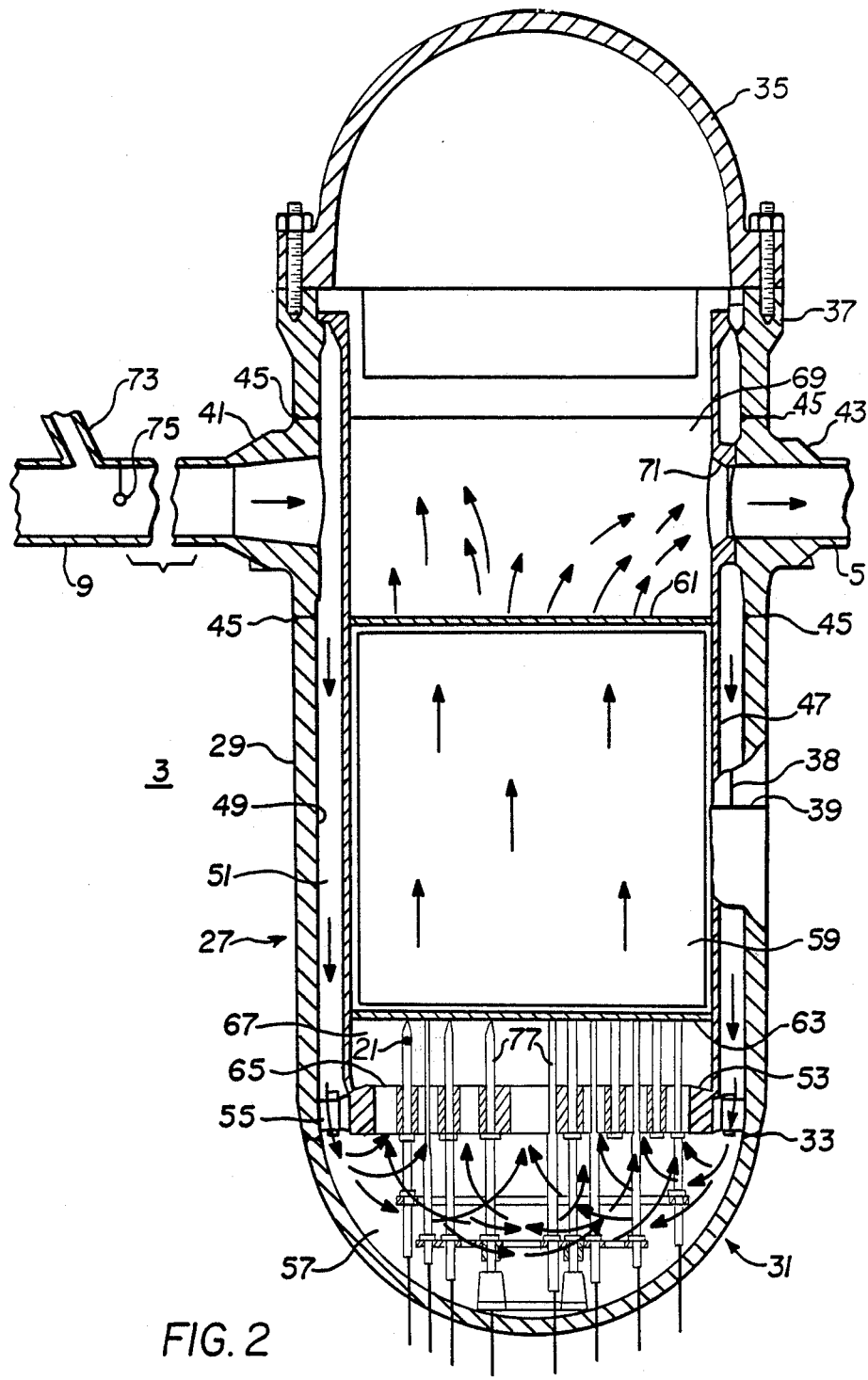
FIG. 2 is a vertical section through a nuclear reactor which forms a part of the reactor system depicted in FIG. 1.

As seen in FIG. 2, the reactor 3 of a typical PWR includes a steel pressure vessel 27 with a cylindrical center section 29, a hemispherical lower head section 31 welded at 33 to the center section and a removable, hemispherical head 35 bolted to a flange 37 at the upper end of the center section 29. The cylindrical center section 29 is fabricated from steel plates welded along both longitudinal 38 and circumferential welds 39. An inlet nozzle 41 and outlet nozzle 43 for each loop (only 1 each shown) are welded into the upper region of the center section 29 of the pressure vessel as shown at 45 and are connected to the loop cold leg conduit 9 and hot leg conduit 5 respectively.

A core barrel 47 suspended from the upper flange 37 inside the pressure vessel 27 and spaced radially inward from the inner wall 49 of the vessel forms an annular downcomer 51. The lower end of the core barrel 47 is connected to a lower core support structure 53 which in turn is positioned in the vessel via keys on the lower core support structure and clevis blocks on the vessel wall 49 that form passages 55 through which the downcomer 51 communicates with the interior 57 of the hemispherical lower section 31 of the vessel. A reactor core, shown schematically at 59, is mounted inside the core barrel 47 between upper and lower core support plates 61 and 63 respectively. The lower core support structure 53 has additional apertures 65 through which the interior 57 of the hemispherical lower section 31 of the vessel communicates with a core inlet region 67 below the lower core plate 63. Above the upper core plate 61 is a region 69 in which the reactor control rods and drive mechanisms (not shown) are located. This region 69 is connected to the hot leg conduits 5 by nozzle sections 71 on the core barrel which register with the outlet nozzle 43.

As shown by the arrows in FIG. 2, reactor coolant from cold leg conduit 9 enters the pressure vessel through inlet nozzle 41, and circulates along the inner wall 49 of the pressure vessel as it passes downward through downcomer 51. From the downcomer, it passes through passages 55 into region 57 and then upward through apertures 65 into inlet region 67. The reactor coolant then circulates upward through the core 59 where it absorbs the heat generated by fission reactions. The heated coolant passes into the region 69 from which it is discharged into the hot leg conduit 5 of each loop through an outlet nozzle 43.

Under normal operating conditions, the temperature of the reactor coolant returned through the cold leg conduits 9 is typically about 550 degrees F. Under steady state conditions, the thick walls of the pressure vessel reach a fairly uniform temperature throughout. However, due to the large mass of the pressure vessel, changes in reactor coolant temperature result in variations in the temperature across the thick vessel walls which can be substantial. This temperature gradient creates the stresses which are a function of the magnitude and the rate of changes in coolant temperature. The stresses in the pressure vessel are also a function of the pressure of the reactor coolant. Under normal operating conditions, the temperature and pressure transients do not generate stresses in the pressure vessel walls which are a threat to vessel integrity. During startup and normal shutdown, the changes in temperature and pressure are regulated to remain within limits set by the NRC so that again, there is no threat to vessel integrity.

Under some abnormal conditions, however, a safety injection system (not shown) injects cold, highly borated reactor coolant into the cold leg conduit 9 through conduit 73 to cool the core 59. The resultant change in the temperature of the coolant circulated along the inner walls of the pressure vessel can create large stresses which are a potential threat to vessel integrity. Generally, in each type of vessel, there are identifiable locations which are most susceptible to non-ductile failure resulting from the stresses generated by severe thermal or pressure transients. These critical locations are typically at a weld location such as 45, especially the welds 39 adjacent the core 59 where the fluence which causes embrittlement is greatest.

The typical PWR has temperature sensors such as resistance temperature detectors (RTDs) 75 located in the cold leg conduits 9 for measuring reactor coolant temperature for control, monitoring, and protection purposes. Under normal flow conditions, these RTDs provide a reasonably accurate measurement of the temperature of the reactor coolant as it circulates along the inner wall 49 of the pressure vessel for most purposes. However, in accordance with the present invention which provides the capability of making a more precise determination of the margin to non-ductile failure in a pressure vessel under thermal shock transients, a more accurate determination of the temperature of the reactor in the downcomer 51 is desirable.

PWRs are typically provided with instrumentation thimbles or guide tubes 77 which extend upward through the reactor core from below to provide access in the core for fixed or movable sensors such as neutron flux detectors. In accordance with the invention, the thermocouples 21 are installed in some of these thimbles in the core inlet area 67 below the lower core plate 63 which protects them from excessive radiation emitted by the reactor core 59. These thermocouples provide an accurate measure of the temperature of the reactor coolant in this area.

Figure 3:
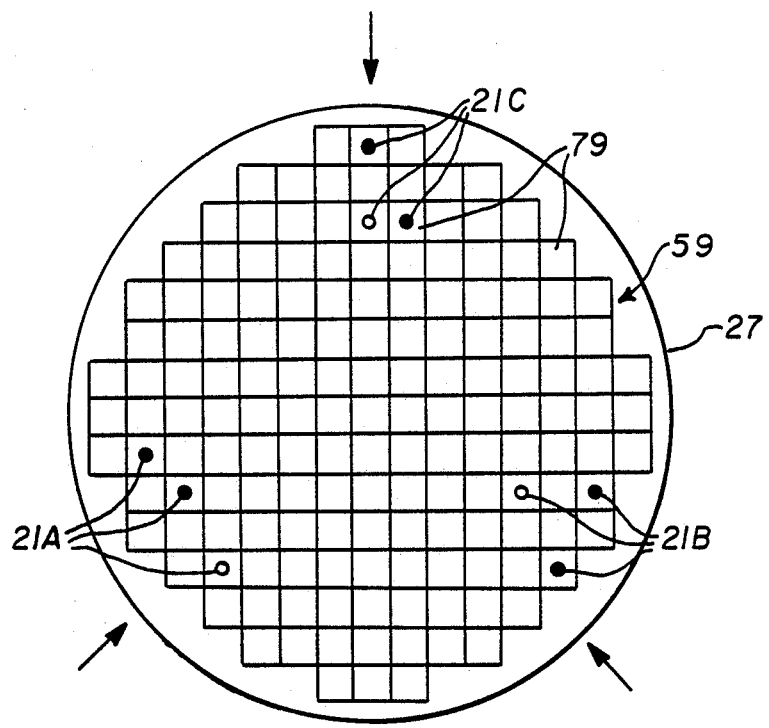
FIG. 3 is a diagram illustrating an exemplary distribution of inlet thermocouples in the reactor of FIG. 2.

FIG. 3 is a plan view illustrating a suitable arrangement of thermocouples 21 according to the invention in certain fuel cells 79 which make up the core 59 of a typical 3 loop PWR. Instrumentation thimbles are not provided in every fuel cell, but are distributed across the core in a pattern which provides representative flux measurements. Representative reactor coolant temperature measurements are obtained by locating thermocouples in thimbles at the locations shown by the references character 21 with the appropriate loop suffix. The solid dots indicate exemplary locations for redundant thermocouple measurement points for each loop while the open circle indicates a suitable location for the third measurement point for each loop when increased reliability is desired. As indicated, the thermocouples for each loop are in substantial vertical alignment with the inlet nozzle for the associated loop each of which is represented in FIG. 3 by a radial arrow.

Figure 4:
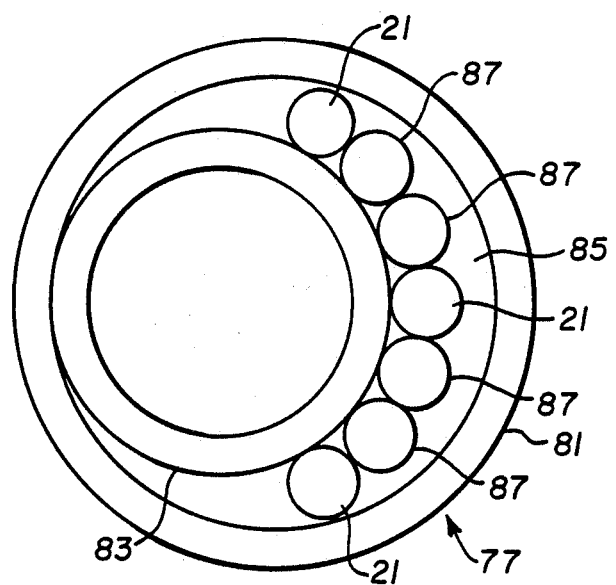
FIG. 4 is a horizontal section through a combination thimble which forms a part of the reactor of FIG. 2.

FIG. 4 illustrates a combination in-core instrumentation thimble 77 suitable for use with the invention. Such a thimble includes an outer tube 81 and an eccentrically mounted inner tube 83 in which a movable in-core neutron flux detector (not shown) is received. Redundant (3 shown) inlet thermocouple leads 21 are inserted in the space 85 between the inner and outer tubes along with a number of core outlet thermocouples leads 87 presently provided to measure the temperature of the reactor coolant as it leaves the core.

In accordance with the teachings of the invention, the thermocouple readings taken in the core inlet area are used in conjunction with the temperature measurements made by the RTDs in the cold leg conduit to provide a more accurate determination of the temperature of the reactor coolant in the downcomer. Under normal flow conditions, the temperatures at these two locations, before and after the coolant passes through the downcomer, do not differ appreciably and the two readings are averaged to determine the temperature of the coolant to which the pressure vessel walls 49 are exposed. This remains true during safety injection of cold borated water into the cold leg conduits as long as flow through the conduits is effected by reactor coolant pump operation or by natural circulation between the reactor vessel and the steam generator. However, during the course of some abnormal events, the normal flow of reactor coolant in one or more loops stops, or is terminated by the operator in responding to the initial event. Cold water injected into a cold leg conduit under these stagnant flow conditions may tend to stratify so that the RTD temperature readings are not necessarily representative of the temperature of the coolant circulating along the inner wall 49 of the pressure vessel. The pattern of stratification under stagnant flow conditions remains reasonably consistent so that a correlation for converting both the RTD and inlet thermocouple temperature readings to downcomer temperatures can be determined. The more accurate measurement of the temperature of the coolant flowing along the inner wall of the vessel available with this technique reduces the need for conservatism in the analysis of vessel integrity thereby increasing the operating margin of the reactor.

A suitable correlation for on-line vessel integrity calculations under stagnant flow conditions has been developed between the temperature in the cold leg, as measured by the RTDs, and the temperature at the midplane in the downcomer, using data from the Creare one-fifth scale thermal fluid mixing tests mentioned above. Since RTDs at the top of the cold leg were used, the correlation is conservative in that the buoyancy forces associated with the injection of cool Safety Injection (SI) fluid into stagnant warmer primary loop fluid tend to minimize mixing of those fluids, and is likely to yield a maximum difference between the measured fluid thermal response at the top of the cold leg and the reactor vessel beltline. SI injection angles of both 60 degrees and 90 degrees with the cold leg were considered.

To allow data from several tests performed at various conditions to be compared directly and to allow for easy extrapolation for the on-line correlations, the experimental test data were normalized as follows:

$$T_{BL^*} = \frac{T_{BL} - T_{SI}}{T_{Loop} - T_{SI}} \qquad \text{Equation (1)}$$

where:

$T_{BL}$ = Fluid temperature at modeled reactor vessel beltline at a given time after initiation of SI.

$T_{Loop}$ = Initial bulk fluid temperature in model prior to initiation of SI.

$T_{SI}$ = SI fluid temperature (assumed constant through the test).

$T_{BL}^*$ = Normalized fluid temperature difference ratio for the reactor vessel beltline at a given time after initiation of SI.

A normalized fluid temperature difference ratio $T_{CL}^*$ for the top of the cold leg at time t seconds after initiation of SI is calculated by the similar relationship:

$$T_{CL}^* = \frac{T_{CL} - T_{SI}}{T_{LOOP} - T_{SI}} \quad \text{Equation (2)}$$

where $T_{CL}$ is the cold leg temperature during the transient as measured by the RTD at the top of the cold leg and the other parameters are as defined above. All of the temperatures are in degrees Fahrenheit except $T_{BL}^*$ and $T_{CL}^*$ which are dimensionless.

Using temperature history traces from three tests, one with a 90 degree SI injection angle and two with 60 degree SI injection angles, values of $T_{BL}^*$ and $T_{CL}^*$ were calculated at coincident times throughout each of three tests. The duration of each of the three tests was determined, in part, by the Froude number at which the test was initiated. To remove the dependency of the normalized data on Froude number simulation, values of $T_{BL}^*$ were plotted as a function of corresponding values of $T_{CL}^*$. This plot is shown in FIG. 12.

Figure 12:
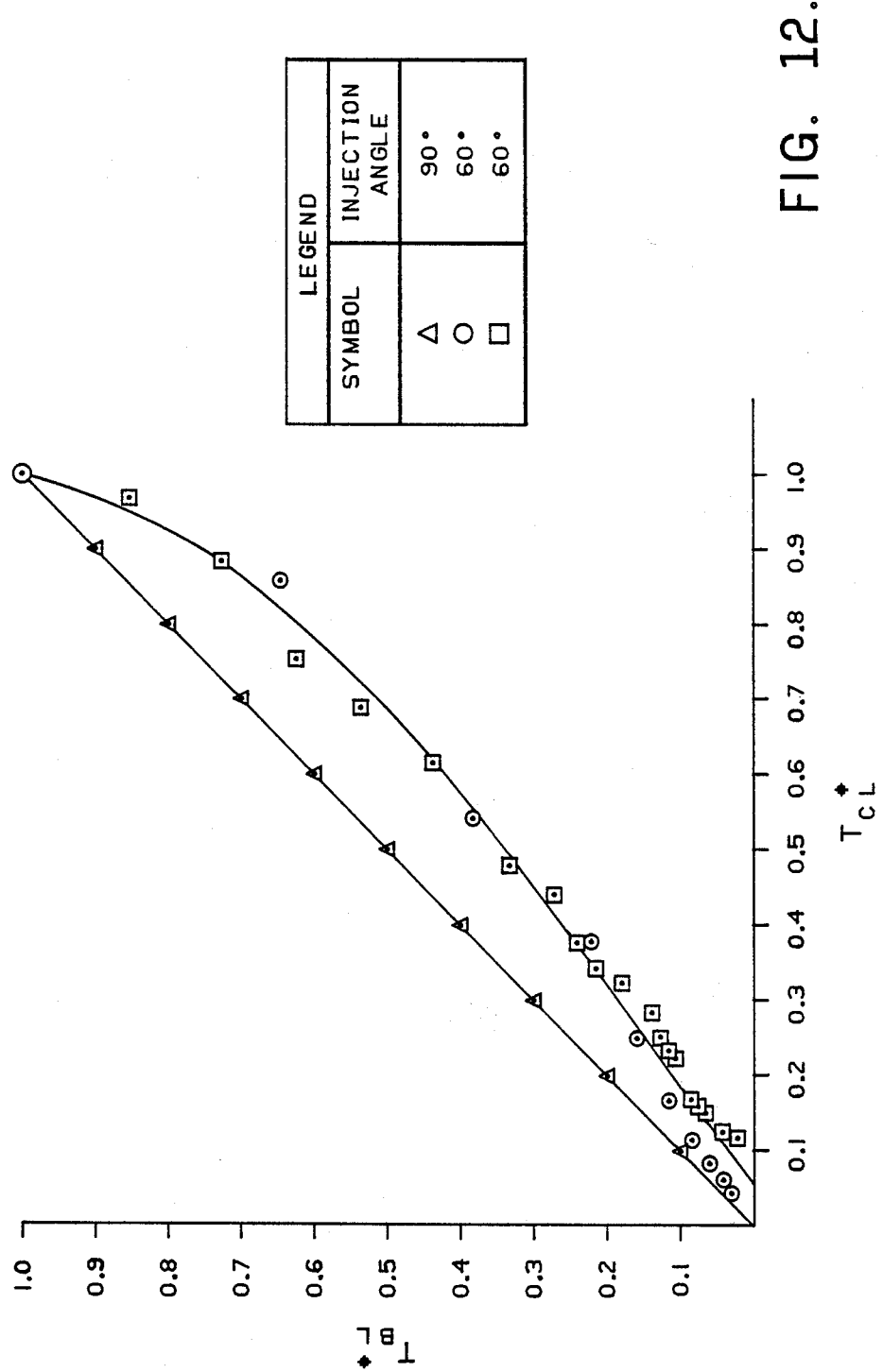
FIG. 12 is a plot of the correlation between the normalized cold leg temperature and beltline temperature in accordance with the invention.

The data of FIG. 12 indicate that the angle of the SI nozzle influences the relationship between the observed fluid transient at the top of the cold leg and that at the reactor vessel beltline. For 90 degree injection, the fluid transient at the top of the cold leg gives a reasonable approximation of the fluid thermal transient at the reactor vessel beltline. With SI injection at 60 degrees; the fluid thermal transient at the top of the cold leg progresses mre slowly than does that at the reactor vessel beltline, and therefore the RTD reading is a nonconservative approximation of the fluid thermal transient at that location. However, the correlation provides a conservative approximation which reflects the fact that the temperature at the beltline will drop more quickly than that recorded by the RTD.

In applying this correlation to determining fluid temperature at the beltline on-line under stagnant flow conditions, $T_{CL}^*$ is determined from equation (2) above. The temperature of the SI injection water is known from the temperature of the water in the refueling water storage tank which is the source of SI injection water. This temperature remains essentially constant during SI injection. The temperature $T_{Loop}$ is the temperature in the cold leg and at the belt line prior to SI injection and is available from a stored value measured by the RTD 75. $T_{CL}$ is the temperature as measured by the RTD in the cold leg. The calculated value of $T_{CL}^*$ is used to enter the plot of FIG. 12 to determine the corresponding value of $T_{BL}^*$. $T_{BL}$ is then calculated from equation (1).

In accordance with the invention then one or more critical locations in the vessel are selected from the design of the pressure vessel for monitoring. As mentioned previously, these critical locations most likely are found at the welds and especially the welds adjacent the reactor core where the fast neutron fluence is highest resulting in the most severe embrittlement of the weld material. Typically, one to several critical locations are chosen for monitoring. The physical characteristics of each of these locations, including the geometry, the thermal properties, and the copper and nickle content, are provided to the computer. The neutron flux is monitored and integrated with time to measure the fluence at each critical location. The temperature of the reactor coolant for each of the critical locations is determined continually from the RTDs and the inlet thermocouples with appropriate correlations for stagnant flow as applicable. These temperatures, along with on-line reactor coolant pressure measurements, and the fluence measurements are utilized to make an on-line, real-time analysis of the vessel integrity at the critical locations using fracture mechanics analysis. Such an analysis is made automatically when the rate of change in temperature and pressure indicate an abnormal condition. During heatup and cooldown, compliance with Appendix G criteria established by Section III of the A.S.M.E. code previously mentioned is monitored and if compromised, an immediate analysis is made to determine how close the vessel may have come to non-ductile failure.

A more detailed explanation of the operation of the invention can be gained from the flow diagrams of FIGS. 5 through 8 which set forth the programs carried out by the digital computer 23 in gathering the data from the plant and performing the on-line, real-time analysis of the vessel integrity. Initially, as shown in block 89 in FIG. 5, a flag which indicates whether or not a pressure and/or temperature transient of sufficient magnitude is in progress to necessitate a vessel integrity analysis is set equal to FALSE. The program then awaits the next scan time in block 91. The scan interval is selected taking into account the severity of possible abnormal events and the time required for an appropriate response. A suitable interval is about 1 to 2 minutes. When a scan is started in block 93, the current reactor coolant pressure, P(t), as measured by the transducer 15, is read, converted to engineering units and calibrated in block 95. If this current pressure reading exceeds the reading recorded on the last scan, as determined in block 97, by an amount, $e_p$, indicative of a potentially significant pressure transient, the analysis flag is set to TRUE in block 99. By way of example, a change of about 75 psi can be selected as the trigger point for an analysis based on a pressure transient.

Figure 6:
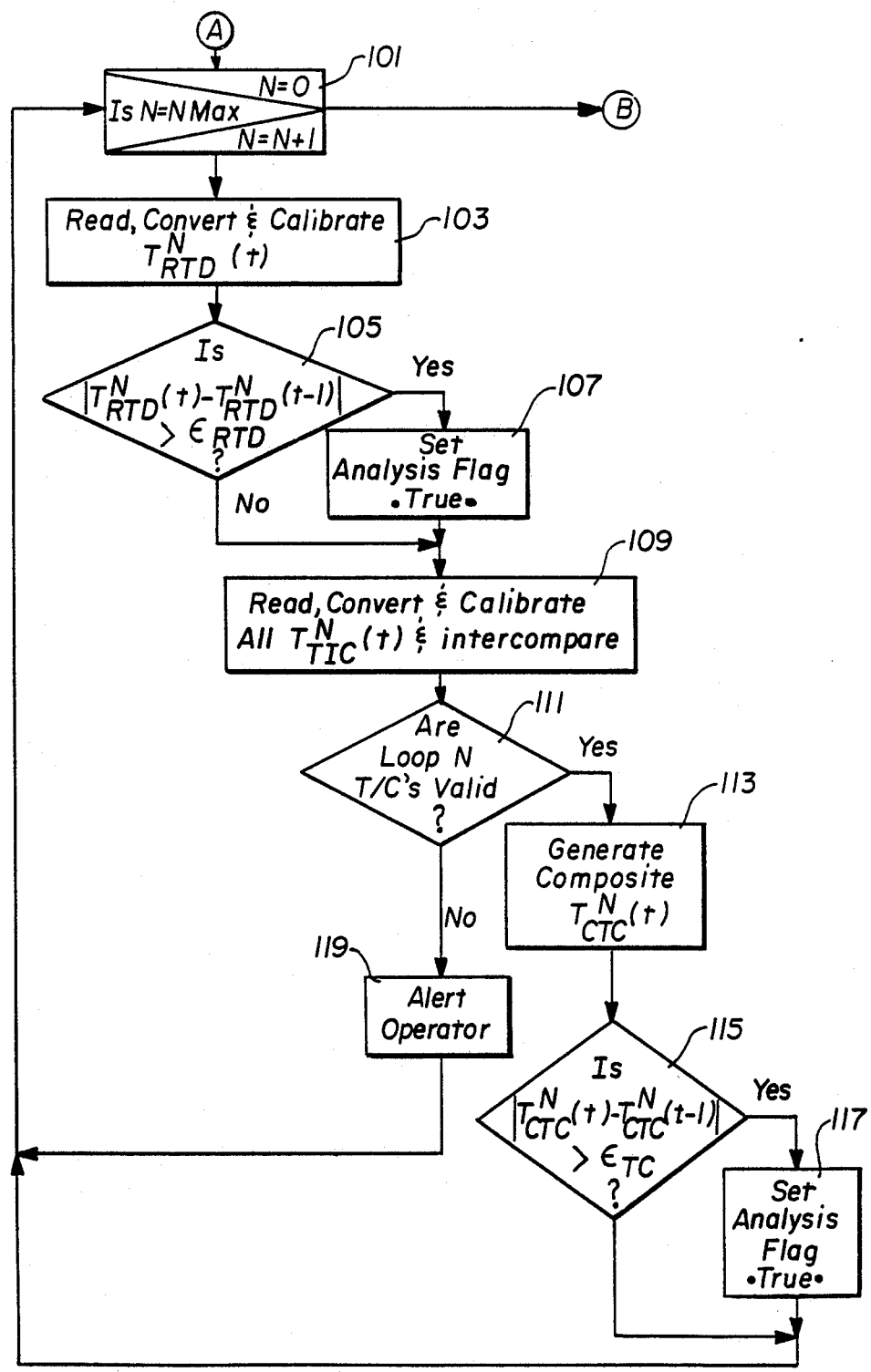

After the pressure has been checked the temperature of the coolant in each reactor coolant loop is determined sequentially in a program loop which is entered at block 101. In this program loop, which is shown in FIG. 6, the temperature of the reactor coolant in the cold leg conduit as measured by the resistance temperature detectors, RTDs, is read, converted to engineering units, and calibrated in block 103. Typically, redundant RTDs are provided in each cold leg, and other parts of the plant, which already use these temperature measurements for other purposes, check the individual signals for validity and provide a composite reading for the loop. This value of the cold leg temperature is compared with the value stored from the previous scan in block 105, and if it differs by a preselected value, for example 5 degrees F., indicating a significant transient which requires analysis, the analysis flag is made TRUE in block 107. Next, each of the redundant inlet thermocouple signals for the loop are read, converted to engineering units, calibrated and intercompared with each other in block 109. If this intercomparison shows the readings to be valid as determined in block 111, a composite thermocouple signal for the loop is generated in block 113, as by averaging, and this composite value is compared with the corresponding value on the previous scan in block 115. If the current value differs from the previous value by more than preselected amount, again, an exemplary value is about 5 degrees F. for a scan interval of one to two minutes, the analysis flag is set to TRUE in block 117. The program then loops back to block 101 and checks the temperature readings for the next reactor coolant loop, N. If the thermocouple readings are not valid, the operator is alerted in block 119 before the next reactor coolant loop is analyzed.

Figure 5:
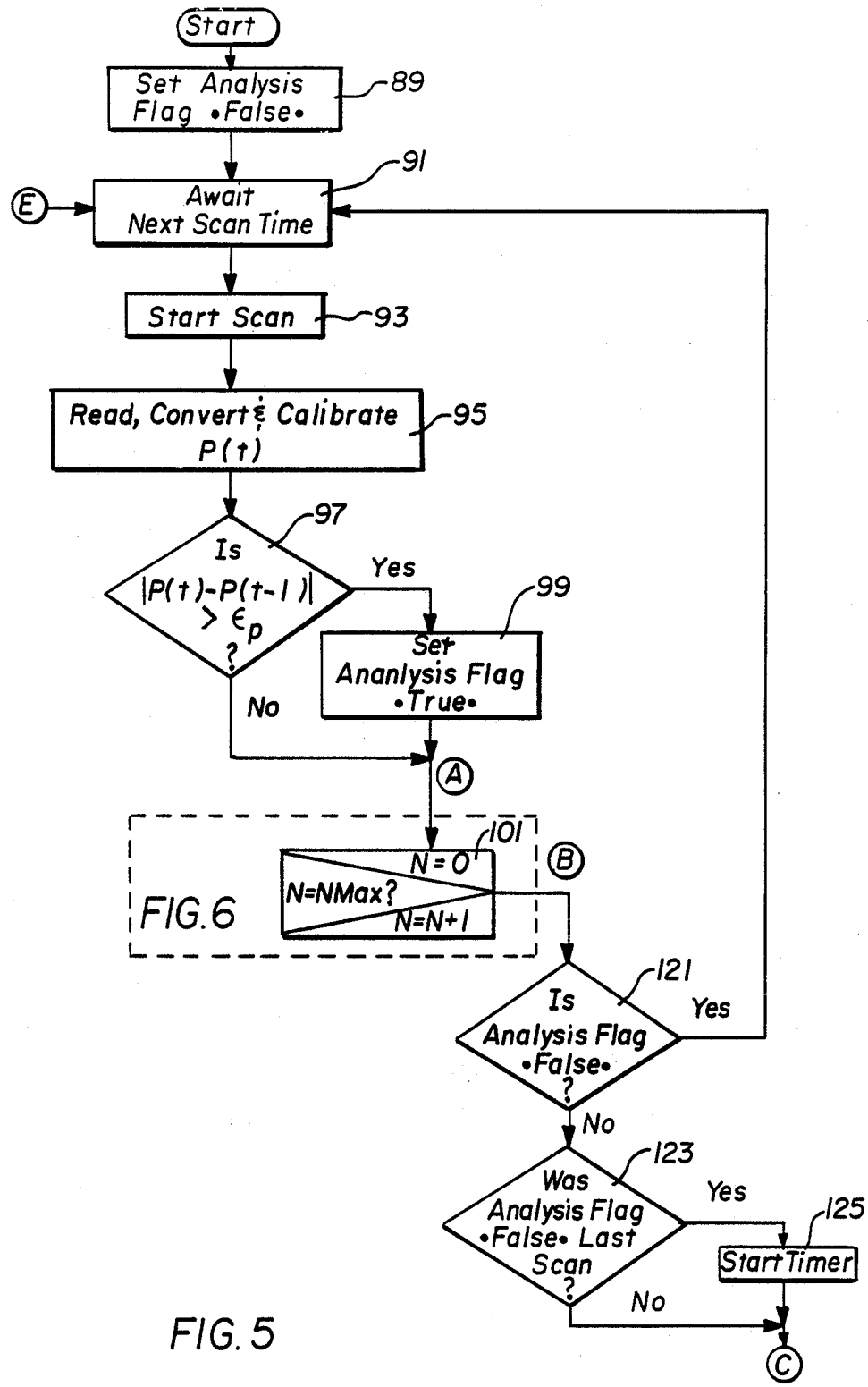
FIGS. 5 through 8 are flow charts illustrating the operation of the invention in performing on-line monitoring, analysis and recommended operator action functions.

When all of the reactor coolant loop temperatures have been processed, the program proceeds by way of tag B back to FIG. 5 where the analysis flag is checked in block 121. If the pressure and all the loop temperatures are within limits, the program returns to block 91 and awaits the next scan. If an analysis is required, however, an event timer is started on the initial scan in which the transient is detected as carried out in blocks 123 and 125, and the program then proceeds to FIG. 7 as indicated by the tag C.

In carrying out the analysis function, the signals representative of the "on line" plant specific vessel and material properties are generated and/or stored as indicated generally by reference character 127 in FIG. 127. This includes storing vessel geometric and thermal properties for each of the critical locations, j, of the vessel the block 129. It also includes generating the fast neutron fluence at each location j, as shown by block 131. The fluence can be calculated, for instance, by multiplying an effective full power hour signal available from the plant computer by a stored neutron flux rate signal for each critical location. Alternatively, if the local neutron flux is available at the locations j, it can be integrated with time to determine the current fast neutron fluence. The stored plant specific values also include, for each critical location j, the initial reference nil-ductility transition temperature, $RT_{ndt}$, and the percent copper and nickel content of the steel. From these parameters, signals representative of the real time, actual $RT_{ndt}$ distribution through the wall at each location j are generated in block 135 by continually updating the $RT_{ndt}$ distribution taking into account embrittlement resulting from the fast neutron fluence.

The "on-line" plant specific vessel and material properties signals are also utilized in the generation of the required $RT_{ndt}$ signals. First, a determination is made in block 137 whether the reactor coolant pressure and temperature conditions are within the limits set by Appendix G of Section III of the A.S.M.E. code for heatup and cooldown. If they are not, indicating an abnormal transient, a determination is made in block 139 and 141 for each reactor coolant loop, whether the coolant is being circulated by the reactor coolant pump or by natural circulation, or whether the flow is stagnant. If the composite thermocouple signal and the associated RTD signal for a given loop differ by less than a preselected amount, forced flow conditions are assumed to exist and the thermocouple and RTD signals are averaged in block 143 to provide the indication of the temperature of the reactor coolant circulating along the inner wall of the reactor vessel, and this temperature is displayed to the operator as indicated in block 145. In addition, the heat transfer coefficient, h(t), is set for forced convection in block 147.

When stagnant flow conditions are detected in block 141 for a given loop, the RTD temperature and the RTD correlation provided above are used to estimate the reactor coolant temperature in the downcomer. Alternatively, or in addition, an estimate of the downcomer temperature could be derived from the composite inlet thermocouple temperature and an empirically established thermocouple correlation factor as indicated in block 151. Where both correlations are used, a "best estimate" for the reactor coolant temperature in the downcomer is calculated in block 153 as the average of the two estimated temperatures. This reactor coolant temperature for stagnant flow conditions is displayed to the operator as indicated in block 145 and the heat transfer coefficient is set for free convection in block 155.

Next the temperature of the reactor coolant at critical location j is determined in block 157 using the appropriate reactor coolant loop temperature and the existing flow conditions. This temperature and the measured reactor coolant pressure are then utilized to perform a real-time fracture analysis of the vessel at each critical location. First, the reactor coolant temperature at location j and the heat transfer coefficient, h(t), together with the vessel specific properties, are used in block 159 to generate a real-time temperature distribution through the vessel wall at location j. A similar distribution of pressure through he wall at location j is also generated in block 159. The temperature and pressure distributions through the vessel wall of real-time thermal and pressure stress at location j.

Next, a distribution of the real time stress intensity factor, $K_I(t)$ at location j is derived in block 163 from the thermal and pressure stress distribution generated in block 161 and by postulating in block 165 a sequence, i, of flaws of varying depth, a, extending from the inner surface of the vessel wall outward at location j. By way of example, a series of 25 flaws (i=1 to 25) at successively increasing depths across the vessel wall at location j can be postulated. This stress intensity factor, $K_I(t)$, is a measure of the driving force that the stress created by the change in reactor coolant temperature and/or pressure imposes on a postulated flaw in the vessel wall. The distribution of $K_I(t)$, for the postulated flaws, provides a real time representation of the stress intensity for flaws of all depths across the vessel wall.

The temperature distribution through the vessel wall generated in block 159, is used along with the "actual" $RT_{ndt}$ distribution generated in block 135, to generate in block 167 a distribution or profile of the fracture initiation toughness $K_{IC}(t)$, through the vessel wall at location j. This fracture initiation toughness is a measure of the resistance of the vessel wall to flaw initiation. The techniques for generating the pressure and temperature distributions through the vessel wall, and the resultant thermal and pressure stress distribution, as well as those for determining the stress intensity factor distribution and the fracture toughness distribution, are known in the art. For instance, see a paper entitled "Method for Fracture Mechanics Analysis of Nuclear Reactor Vessels Under Severe Thermal Transients", by C. B. Buchalet and W. H. Bamford and published by the American Society of Mechanical Engineers, 1975.

The stress intensity factor distribution and fracture initiation toughness distribution are then used in block 169 to generate a "required" $RT_{ndt}$ distribution for the location j. This is achieved by determining for each postulated flaw depth, the value of $RT_{ndt}$ that would be required to make the fracture toughness, $K_{IC}(t)$, equal to the stress intensity factor, $K_I(t)$. Since the stress intensity factor is a real time parameter determined as a function of the current and recent values of the reactor coolant temperature and pressure, the required $RT_{ndt}$ represents the value that the $RT_{ndt}$ for the material at location j would have to be in order for the current conditions to cause a flaw to propagate.

Figure 9:
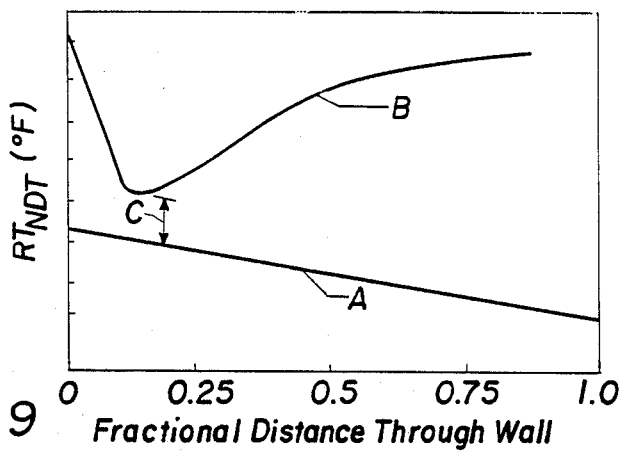
FIG. 9 is a diagram illustrating an example of a display generated by the invention.
Figure 10:
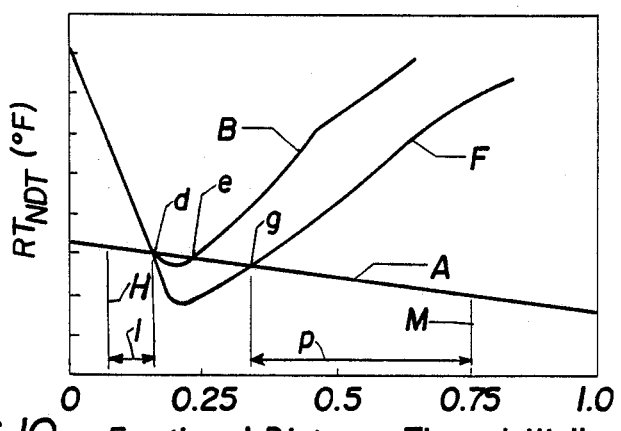
FIG. 10 is a diagram illustrating a display similar to that of FIG. 9, but under other operating conditions.

By comparing the required $RT_{ndt}$ with the actual $RT_{ndt}$ previously calculated, a determination can be made as to whether the transient has created conditions under which a flaw could propagate. The preferred manner of making this comparison is to generated a visual display of the required and actual $RT_{ndt}$s as indicated in block 171 of FIG. 7. Typical displays generated in this manner are shown in FIGS. 9 and 10. The trace A represents the actual $RT_{ndt}$ of the material through the vessel wall at location j. The actual $RT_{ndt}$ for practical purposes remains constant throughout a transient. Radiation embrittlement causes the actual $RT_{ndt}$ trace to creep upward over an extended portion of the typical 40 year life of the vessel. The trace B in FIG. 9 is the required $RT_{ndt}$ for flaw initiation. For the instant during a transient represented by FIG. 9, a margin C exists between the required and actual $RT_{ndt}$.

FIG. 10 illustrates an instant in a transient when the required $RT_{ndt}$ flaw initiation trace B projects below a portion of the actual $RT_{ndt}$ trace A. The required $RT_{ndt}$ becomes equal to the actual $RT_{ndt}$ at point, d, approximately 0.15 of the fractional distance through the wall for the conditions exemplified, and remains less than the actual $RT_{ndt}$ until the point, e, approximately 0.20 of the way through the wall. These conditions indicate that any flaw which extended from the inner surface of the vessel wall to a depth between points d and e would propagate as a result of the stresses induced by the transient. Flaws of lesser or greater depth would not propagate under the stresses present at the displayed instant.

There is a theory discussed in the above cited A.S.M.E. paper that a running crack in a material subjected to a stress field will arrest when the stress intensity factor becomes smaller than a property identified at the arrest fracture toughness, $K_{Ia}$. Thus, when the required $RT_{ndt}$ falls below a portion of the actual $RT_{ndt}$ profile, as it does in FIG. 10, an arrest fracture toughness distribution at location j is generated in block 167 in addition to the flaw initiation fracture toughness distribution. A "required" $RT_{ndt}$ distribution for flaw arrest is then generated in block 169 using the stress intensity factor distribution and this arrest fracture toughness distribution in the same manner as the flaw initiation required $RT_{ndt}$ distribution is generated. This required $RT_{ndt}$ for flaw arrest is then presented on the operator's display as trace F as shown in FIG. 10. As shown in the example, the required $RT_{ndt}$ for arrest rises above the actual $RT_{ndt}$ at point g which is about 0.28 of the distance through the vessel wall. Thus, should a flaw exist which extends to a depth between points d and e, it will propagate to a depth represented by point g before it will arrest since the $RT_{ndt}$ for flow initiation rises above the actual $RT_{ndt}$ at point e.

This visual display provides the operator with a very powerful tool for monitoring and, if necessary, controlling conditions which affect the integrity of the reactor pressure vessel. For instance, by monitoring the display under the conditions shown in FIG. 9, the operator can observe what the margin to flaw initiation is. By observing successive displays, which may be stored for rapid playback, the operator can learn how fast the margin is changing and gauge whether flaw initiation conditions are likely to occur. If flaw initiation conditions should occur, the display of FIG. 10 provides the operator with information on the depth of a flaw that must be present for flaw propagation, and the depth that it would likely propagate to before arrest.

The display can also be used to provide additional information about vessel integrity. For instance, as can be seen from the required $RT_{ndt}$ curves, the stress caused by a thermal shock event must be very high to initiate propagation of a flaw extending only a short distance in from the inner surface of the vessel wall. Thus, minor flaws at the surface can be tolerated. It is also a factor that inspection techniques can only reliably detect flaws which penetrate beyond a certain minimum depth. Accordingly, minimum flaw initiation acceptance criteria can be established and presented on the display as a trace, H, as shown in FIG. 10. A margin, l, may then be observed on the display between the minimum depth, d, at which flaw initiation would occur under existing conditions and the minimum acceptance criteria. Thus, even though the required $RT_{ndt}$ for flaw initiation drops below the actual $RT_{ndt}$, as long as there were no flaws which exceeded the minimum criteria for flaw initiation and as long as the margin, l, is large enough, it can reliably be concluded that no damage has been done to the vessel.

In addition, for safety reasons a maximum depth at which a flaw must be arrested to avoid catastrophic failure can also be established, and a trace, M, may be presented on the display at this point as shown in FIG. 10. The display then also provides a visual indication of a margin, p, between the maximum flaw arrest depth which occurs at point g and the acceptance criteria for vessel failure as represented by the trace M. Thus, even if a flaw propagated, as long as the margin to the maximum flaw arrest depth is large enough, it can be reliably determined that catastrophic failure is not a threat.

As a further feature of the invention, recommendations for action to be taken by the operator to alleviate the situation where there is a threat, or an imminent threat, to vessel integrity can be provided automatically. As part of this feature, indications can be provided in association with the display as to the seriousness of the threat such as, for example, by color coding, special indicia, flashing video, audio signals or any combination of these or other indications. For instance, the required $RT_{ndt}$ trace B may be in a region coded green when there is no imminent threat, orange when the margin C falls below a preset value, and red when it intersects the actual $RT_{ndt}$ trace A. This color coding can be associated with a set of instructions designed to guide the operator through steps to be taken to modify conditions so as to reduce the threat to vesel integrity. Since there are a large number of interacting variables in a complex system such as a nuclear reactor, the instructions can best be presented in status tree form which can be designed to take into account the dynamic effects of each corrective measure to assure that other critical functions are not adversely affected. Such a system for status tree analysis is disclosed in commonly owned U.S. Pat. No. 4,552,718 entitled "Method and Apparatus for On-Line Monitoring of the Operation of a Complex Non-Linear Process Control System". As shown in blocks 173 and 175 in FIG. 7, the status tree criteria and the recommended instructions are presented to the operator.

When an abnormal event occurs in a nuclear reactor, the object is to satisfy a series of well defined critical safety functions which return the reactor to normal operation, or place it in a safe shutdown mode. For example, in a loss of coolant accident, the object is to stabilize the reactor at a safe temperature. Accordingly, following the check of the status tree criteria in FIG. 7, a determination is made in block 177 whether or not the critical safety function for the particular event which has occurred has been reached. If not, the program returns, as indicated by tag E, to block 91 in FIG. 5 to await the next scan. If the critical safety function has been satisfied, the program ends, until another event occurs and the program is restarted in FIG. 5 at block 89.

The invention may also be used for monitoring and analysis during normal plant heatup and cooldown. These conditions are detected in block 137 of FIG. 7 by a determination that the temperature and pressure transients are within the Appendix G criteria. The actual reactor coolant temperature and pressure readings are displayed to the operator in block 145 as in the case of an abnormal thermal shock event. As indicated by tag D, a determination is then made in block 179 of FIG. 8 of the reactor coolant temperature for the critical location x chosen for monitoring and analysis during the heatup or cooldown transient. Generation of a signal representative of this temperature is accomplished in the same manner as previously described for full flow conditions. Next the heat transfer coefficient, h, is set for forced convection in block 181 for use in generation of the pressure and temperature distributions through the vessel wall at location x as indicated in block 183. As required by Appendix G Section III of the A.S.M.E. code, a safety factor of two is applied to the pressure load in block 185 before a temperature and pressure stress distribution at location x is generated in block 187.

Figure 7:
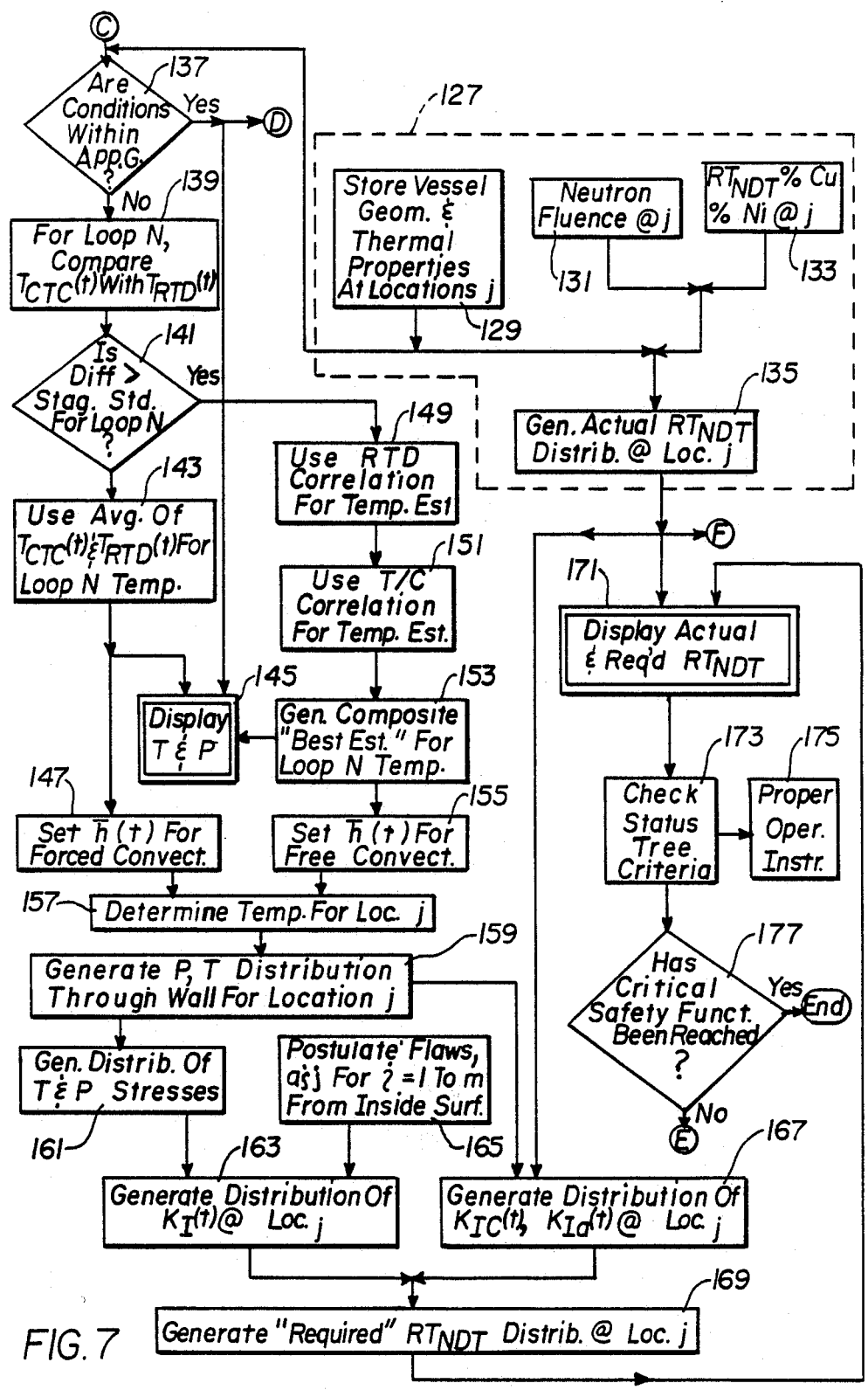
Figure 8:
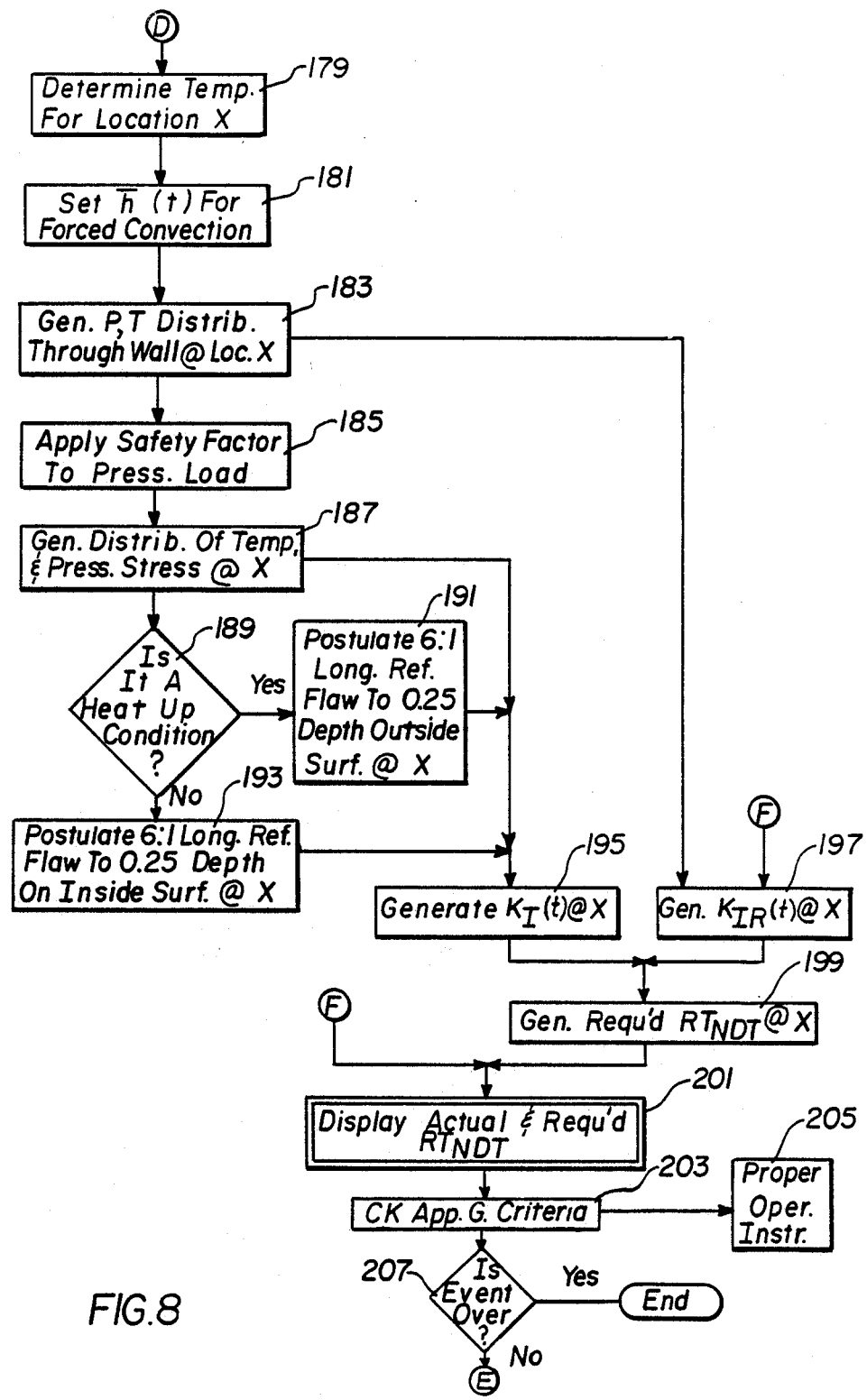
Figure 11:
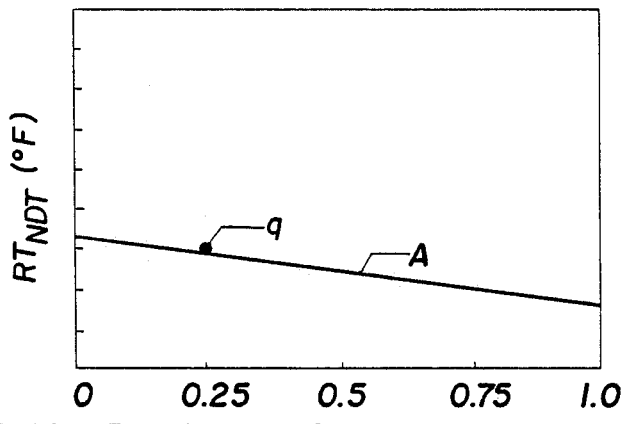
FIG. 11 is a diagram illustrating a display generated by the invention while operating in another mode from that illustrated in FIGS. 9 and 10.

If it is determined in block 189 that a heatup condition exists, a longitudinal reference flaw to a fractional depth of 0.25 of the wall thickness with an aspect ratio of 6:1 (length to depth) is postulated on the outside surface of the vessel as indicated in block 191. On the other hand, for cooldown conditions, a similar flaw is postulated in block 193 on the inner surface of the vessel. The appropriate flaw is used in block 195 together with the temperature and pressure stress to generate a stress intensity factor, $K_I(t)$, for the postulated flaw. The actual $RT_{ndt}$ from block 135 in FIG. 7 is applied through tag F to block 197 along with the temperature from block 183 to generate a reference fracture toughness, $K_{IR}(t)$, which includes a second safety factor. The required $RT_{ndt}$ which makes $K_I(t)$ equal to $K_{IR}(t)$ is then determined in block 199. This required $RT_{ndt}$ is displayed with the actual $RT_{ndt}$ also received through tag F as indicated in block 201. FIG. 11 illustrates an exemplary display for a cooldown event. Since, as is mandated, only a flaw at 0.25 depth was postulated in generating this display, a single dot, Q, appears as the required $RT_{ndt}$. The object during heatup and cooldown is to keep the required $RT_{ndt}$, trace Q, on the actual $RT_{ndt}$, trace A, for optimum conditions. The fact that the required $RT_{ndt}$ equals the actual value at 0.25 depth does not indicate that a flaw of that depth would propagate because of the safety factors applied to the pressure load and incorporated into the calculation of fracture toughness $K_{IR}(t)$. In fact, the actual margin should be similar to that shown in FIG. 9. If during heatup or cooldown, the Q trace dips below the A trace, the operator can switch to the analysis mode to generate a display similar to that of FIG. 9 where the actual margin can be observed.

As in the case of an abnormal thermal shock event, Appendix G criteria can be checked in block 203, and instructions as necessary may be presented to the operator in block 205. For instance, if conditions indicate that the heatup or cooldown event is entering a caution status, it could be recommended to the operator to switch to abnormal thermal shock even analysis where the event can be monitored more closely while corrective action is being taken.

From the above description, it can be appreciated that the present invention not only monitors the temperature and pressure during a thermal shock event, but provides an on-line analysis of the effects of these transients on vessel integrity and presents recommendations to the operator of steps to be taken to alleviate their effects. It can also be used to maintain an optimum profile during heatup and cooldown, and could even be used, if desired, to generate conventional heatup and cooldown curves, as defined in Appendix G of the A.S.M.E. code. The invention can also immediately provide the detailed fracture mechanics results for assessment following an abnormal event such that appropriate authorities can determine if the reactor vessel can be safely returned to normal operation.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of real-time on-line monitoring and analysis of nuclear reactor pressure vessel integrity in a unit in which reactor coolant is circulated along the inner wall of the pressure vessel, said method comprising the steps of:

generating signals representative of the temperature of the reactor coolant at selected critical points along said inner wall of the pressure vessel even under stagnant flow conditions on a real-time basis;

generating signals representative of the pressure of the reactor coolant on a real-time on-line basis; and generating on a real-time on-line basis, as a function of changes in the temperature and pressure signals, a visual representation of a margin to non-ductile failure of the vessel at selected critical points for all flaw depths through the vessel wall.

2. The method of claim 1 wherein said step of generating temperature signals comprises measuring the reactor coolant temperature at a point spaced from the selected critical points along the inner wall of the pressure vessel, storing a correlation for converting the measured temperature to actual coolant temperature at said selected critical points under stagnant flow conditions of the reactor coolant, generating the temperature signals for the selected critical points under stagnant flow conditions by correlating the temperature at those points to the measured temperature using the stored correlation, and generating the temperature signals from the temperature measurements without the correlation otherwise.

3. The method of claim 2 including the steps of measuring the reactor coolant temperature at a first location before the reactor coolant is circulated along the inner wall of the pressure vessel and at a second location after the reactor coolant has circulated along the inner wall of the pressure vessel, comparing the temperature measurements at said two locations and using said correlation with at least one of said temperature measurements to generate said temperature signals when the two measurements differ by a preselected amount indicative of stagnant flow conditions.

4. The method of claim 3 wherein the reactor includes a reactor core inside the pressure vessel with a core inlet at the bottom thereof and a cold leg conduit through which reactor coolant enters the pressure vessel near the top of the reactor core, circulates down along the inner wall of the pressure vessel and passes through the core inlet into the core, and wherein said first temperature measurement is taken in said cold leg conduit and the second temperature measurement is taken at the core inlet.

5. The method of claim 4 wherein said temperature signals are generated from the average between the first and second temperature measurements when said measurements differ by less than said preselected amount.

6. The method of claim 4 wherein said reactor has a plurality of reactor coolant loops each including a cold leg conduit and wherein said method includes taking a first temperature measurement for each loop in the associated cold leg conduit and taking a second temperature measurement for each loop at the core inlet under the associated cold leg conduit and wherein said method further includes the step of preselecting the temperature measurements for generating the temperature signal for a selected critical point from the loop which has the greatest affect on the temperature at the selected point.

7. The method of claim 2 wherein the point spaced from a selected critical point along the inner wall of the pressure vessel at which the reactor coolant temperature is measured is in the cold leg through which reactor coolant enters the pressure vessel and circulates down along said inner wall, wherein said stored correlation is a correlation between a normalized measured temperature and a normalized temperature at said selected critical point, and wherein said correlating step includes determining the normalized measured temperature, determining the normalized temperature at the selected critical point from the normalized measured temperature using said stored correlation, and determining the temperature at the selected critical point from the normalized temperature at such point.

8. The method of claim 7 wherein safety injection water is injected into the cold leg at a known temperature, wherein said step of normalizing the measured reactor coolant temperature comprises determining the ratio of the difference between the measured reactor coolant temperature in the cold leg after safety injection and the temperature of the safety injection water to the difference between the measured reactor coolant temperature in the cold leg before safety injection and the temperature of the safety injection water, and wherein the step of determining the actual temperature at the selected critical point comprises determining the ratio between the sum of the normalized temperature at the selected critical point and the temperature of the safety injection water to the difference between the measured reactor coolant temperature before injection and the temperature of the safety injection water.

9. Apparatus for on-line monitoring and real-time analysis of nuclear reactor pressure vessel integrity in a reactor unit in which reactor coolant is circulated along the inner wall of the pressure vessel, said apparatus comprising:
  means for measuring on a real-time on-line basis the temperature of the reactor coolant along the inner wall of the pressure vessel from measurements taken at a point spaced from the inner wall of the vessel even under stagnant flow conditions;
  means for measuring on a real-time on-line basis the pressure of the reactor coolant;
  digital computer means for periodically sampling said reactor coolant temperature and pressure measurements and for generating on a real-time on-line basis, as a function of changes over time in the measured temperature and pressure, vessel condition signals representative of the proximity to non ductile failure of the pressure vessel wall at selected critical locations for all flaw depths through the pressure vessel wall;
  a visual display device; and
  means for applying said vessel condition signals generated by the digital computer to the visual display device to generate a real-time on-line visual representation of the proximity of the pressure vessel wall to non-ductile failure at the critical locations for all flaw depths.

10. The apparatus of claim 9 in combination with:
  a reactor core in the reactor pressure vessel having a core inlet at the bottom thereof; and
  cold leg conduit means connected to the pressure vessel near the top of reactor core for introducing into the pressure vessel reactor coolant which circulates down along the inner wall of the pressure vessel and then upward through the core inlet into the reactor core; and
  wherein said means for measuring reactor coolant temperature includes first sensor means for measuring the temperature of the reactor coolant in the cold leg conduit means and second sensor means for measuring reactor coolant temperature in said core inlet and wherein said digital computer means periodically samples the temperature measurements from both said first and second sensor means and when the temperature measurements from the first and second sensor means differ by more than a predetermined amount indicative of stagnant reactor coolant flow, applies a stored correlation ot the measurements from at least one of said sensor means to generate the temperature measurement of the reactor coolant at the inner wall of the pressure vessel for use in generating said vessel condition signals.

11. The apparatus of claim 10 wherein said cold leg conduit means includes a plurality of cold leg conduits angularly distributed around the reactor pressure vessel, each forming a part of a reactor coolant loop and each having first sensor means therein for measuring the reactor coolant temperature, and wherein said digital computer means compares the reactor coolant temperature measurement from the first sensor means in each cold leg conduit with the temperature measurements from second sensor means substantially vertically aligned therewith to determine a reactor coolant loop temperature for each loop and utilizes the loop temperature which most influences each critical location in the pressure vessel wall for generating the pressure vessel condition signal therefor.

12. The apparatus of claim 11 in combination with guide tubes which extend upward through the bottom of the reactor pressure vessel, through the core inlet and into the reactor core, and wherein said second sensor means in said core inlet are located in said guide tubes.

13. The apparatus of claim 12 wherein said second sensor means are thermocouples mounted in a plurality of guide tubes distributed across the reactor core in a pattern such that at least two thermocouples provide redundant core inlet temperature measurements for each reactor coolant loop.

14. A method of on-line monitoring and analysis of nuclear reactor pressure vessel integrity in a unit in which reactor coolant is circulated along the inner wall of the pressure vessel, said method comprising the steps of:
generating on an on-line basis, temperature signals representative of the temperature of the reactor coolant circulating along the inner wall of the pressure vessel;
generating on an on-line basis, a pressure signal representative of the reactor coolant pressure;
generating a signal representative of fast neutron fluence to which the reactor pressure vessel has been subjected;
generating as a function of said fluence signal a visual representation of the actual real time reference nil-ductility transition temperature ($RT_{ndt}$) across the entire pressure vessel wall thickness at a preselected critical location in said wall;
generating as a function of transients in said reactor coolant temperature and pressure signals, a visual representation of the real time required $RT_{ndt}$, across the entire pressure vessel wall thickness at said selected critical location, said required $RT_{ndt}$ being the $RT_{ndt}$ that would be required in the pressure vessel wall for flaw initiation to occur as a result of stresses set-up by said transients; and
superimposing said visual representations of the real-time actual and required $RT_{ndt}$'s for flaw initiation across the entire pressure vessel wall thickness for the selected critical location to generate a visual representation of the difference in value between the actual and required $RT_{ndt}$ presented as an $RT_{ndt}$ margin.

15. The method of claim 14 including the steps of monitoring the $RT_{ndt}$ margin and when the required $RT_{ndt}$ at any depth through the vessel wall falls below the actual $RT_{ndt}$ at that depth, indicating that a flaw at that depth would propagate, generating on a real time basis as a function of the transients in the reactor coolant temperature and pressure signals, a visual representation of the $RT_{ndt}$ required for arrest of the propagation of the flaw, and superimposing the arrest $RT_{ndt}$ on the visual representation of the actual $RT_{ndt}$ and flaw initiation $RT_{ndt}$ to present a visual comparison of the actual $RT_{ndt}$ and the arrest $RT_{ndt}$.

16. The method of claim 14 including the step of operating the reactor to maintain the $RT_{ndt}$ required for flaw initiation above the actual $RT_{ndt}$ across the full thickness of a the pressure vessel wall.

17. The method of claim 14 wherein said step of generating the actual $RT_{ndt}$ representation comprises the steps of:
storing signals representative of selected physical characteristics of said pressure vessel at said critical location; and
generating the actual $RT_{ndt}$ representation as a function of said stored physical characteristic signals and said fast neutron fluence signal.

18. The method of claim 17 wherein the step of generating the required $RT_{ndt}$ representation comprises the steps of:
generating as a function of the reactor coolant temperature and pressure signals, the stored selected physical characteristic signals, and said fast neutron fluence signal, a signal representative of the real-time stress intensity factor through the pressure vessel wall and a signal representative of the real-time flaw initiation toughness through the pressure vessel wall at the selected critical location; and
generating the required $RT_{ndt}$ representation through the pressure vessel wall by determining the $RT_{ndt}$s required to make the stress intensity factor signal equal to the flaw initiation toughness signal for all depths through the pressure vessel wall.

19. The method of claim 18 wherein the generation of the real-time stress intensity signal comprises the steps of:
generating from said reactor coolant temperature and pressure signals, signals representative of real-time temperature and pressure distribution through the pressure vessel wall at said critical location;
generating as a function of said temperature and pressure distribution signals, a signal representative of the distribution of the thermal and pressure stress through the pressure vessel wall;
sequentially generating signals representative of flaws of incrementally increasing depth across the pressure vessel wall at said critical location; and
generating said stress intensity factor signal as a function of said thermal and pressure stress distribution signal and said sequentially generated flaw depth signals.

20. The method of claim 19 including additional steps for monitoring and analyzing pressure vessel integrity during reactor heatup and cooldown, said additional steps including the steps of:
monitoring the reactor coolant temperature and pressure signals; and
when changes in said temperature and pressure signals are within preselected limits for heatup and cooldown;
generating heatup/cooldown real-time temperature and pressure distribution signals through the pressure vessel at said critical location, using said reactor coolant temperature and pressure signals and, with regard to said pressure signals, a first preselected safety factor signal;
generating heatup/cooldown thermal and pressure stress distribution signals as a function of said heatup/cooldown temperature and pressure distribution signals;
generating a heatup/cooldown stress intensity signal as a function of said heatup/cooldown thermal and pressure stress distribution signals for an assumed flaw of preselected dimensions extending outward from the inner surface of said pressure vessel wall at said critical location for cooldown and inward from the outer surface for heatup;

generating a heatup/cooldown flaw initiation toughness signal from said stored pressure vessel physical characteristic signals, and said fast neutron fluence signal taking into account a second safety factor;

generating a heatup/cooldown required $RT_{ndt}$ signal by determining the $RT_{ndt}$ which makes said heatup/cooldown stress intensity factor signal for said assumed flaw equal to the heatup/cooldown flaw initiation toughness signal at the depth of the assumed flaw; and generating a real-time representation of a comparison between said heatup/cooldown required $RT_{ndt}$ and actual $RT_{ndt}$ signals.

21. The method of claim 20 including the step of operating the nuclear reactor to maintain the required $RT_{ndt}$ substantially equal to the actual $RT_{ndt}$.

22. A method of on-line monitoring and analysis of the integrity of a vessel in which the inner wall thereof is contacted with a fluid which is subject to varying temperature and pressure conditions, the method comprising the steps of;

generating on an on-line basis signals representative of the temperature of said fluid adjacent the inner wall of the vessel;

generating on an on-line basis signals representative of the pressure of said fluid;

generating signals representative of the actual reference nil-ductility transition temperature ($RT_{ndt}$) across the entire vessel wall thickness at a preselected critical location in said vessel wall;

generating as a function of transients in said fluid temperature and pressure signals, signals representative of the real time required $RT_{ndt}$ for flaw initiation across the entire vessel wall thickness at said selected critical location, said required $RT_{ndt}$ for flaw initiation being the $RT_{ndt}$ that would be required in the vessel wall for flaw initiation to occur as a result of stresses set up by said transients; and comparing said actual $RT_{ndt}$ signals with the required $RT_{ndt}$ singals for flaw initiation to generate a representation of the difference in value between the actual and required $RT_{ndt}$ signals.

23. The method of claim 22 wherein the step of comparing said actual and required $RT_{ndt}$ signals comprises generating real-time visual representations of the values of said actual and required $RT_{ndt}$ signals across the vessel wall and presenting both visual $RT_{ndt}$ representations on one display to generate a visual representation of an $RT_{ndt}$ margin as the difference between the values of the $RT_{ndt}$ signals displayed.

24. The method of claim 22 wherein the step of generating the required $RT_{ndt}$ signal for flaw initiation comprises the steps of:

generating as a function of the on-line fluid temperature and pressure signals, a signal representative of the real-time stress intensity factor through the vessel wall, and a signal representative of the real-time flaw initiation toughness through the vessel wall at the selected critical location; and generating the required $RT_{ndt}$ signal for flaw initiation by determining the $RT_{ndts}$ required to make the real- time stress intensity factor signal equal to the real-time flaw initiation toughness signal for all depths through the vessel wall at said selected critical location.

25. The method of claim 24 wherein the step of generating the real-time stress intensity factor signal comprises the steps of:

generating from said on-line fluid temperature and pressure signals, signals representative of real time temperature and pressure distribution through the vessel wall at said selected critical location;

generating as a function of said temperature and pressure distribution signals, a signal representative of the distribution of the thermal and pressure stress through the vessel wall;

sequentially generating signals representative of flaws of incrementally increasing depth across the vessel wall at said selected critical location; and generating said real-time stress intensity factor signal as a function of said thermal and pressure stress distribution signal and said sequentially generated flaw depth signals.

26. The method of claim 24 including the additional steps of monitoring the $RT_{ndt}$ margin and when the required $RT_{ndt}$ signal for flaw initiation falls below the actual $RT_{ndt}$ signal for any flaw depth, generating on a real-time basis as a function of the on-line fluid temperature and pressure singals, a signal representative of the required $RT_{ndt}$ for flaw propagation arrest, and displaying this signal with the actual $RT_{ndt}$ signal.

27. In combination:

a nuclear reactor having a reactor core housed in a pressure vessel with reactor coolant circulating along the inner surface of the pressure vessel walls and through the reactor core;

means for on-line measurement of the reactor coolant temperature and for generating temperature signals therefrom;

means for on-line measurement of the reactor coolant pressure and for generating a pressure signal therefrom;

digital computer means for periodically sampling said reactor coolant temperature and pressure signals and for generating as a function of said on-line temperature and pressure signals, signals representative for selected locations in the vessel of real-time reference nil-ductility transition temperatures ($RT_{ndt}$) required for flaw initiation across the vessel wall as a result of stresses induced by changes in said temperature and pressure signals and for generating signals representative of the actual $RT_{ndt}$ across the vessel wall at each selected location; and display means for generating a visual display comparing the real-time $RT_{ndt}$ signals required for flaw initiation with the actual $RT_{ndt}$ signals for each selected location.

28. The combination of claim 27 including cold leg conduit means through which the reactor coolant which circulates along the inner surface of the pressure vessel walls enters the pressure vessel and core inlet means at the bottom of the reactor core through which the coolant which cirulates along the vessel walls enters the reactor core and wherein said temperature measurement means includes temperature sensors in said cold leg conduit means and in said core inlet means for generating said temperature signals, and wherein said digital computer means generates said required $RT_{ndt}$ signals for flaw initiation using signals generated by the temperature sensor means in both the cold leg conduit means and the core inlet means.

29. Apparatus for on-line monitoring and analysis of the integrity of a vessel in which the inner wall thereof is contacted by a fluid which is subjected to varying temperature and pressure conditions, said apparatus comprising:

means for measuring on an on-line basis the temperature of the fluid contacting the vessel wall;

means for measuring on an on-line basis the pressure of the fluid; and digital computer means for periodically sampling the fluid temperature and pressure measurements and for generating on an on-line basis as a function of said on-line temperature and pressure measurements, signals representative, for at least one selected location along the inner wall of said vessel, of real-time reference nil-ductility transition temperatures ($RT_{ndt}$) required for flaw initiation at all depths across the vessel wall as a result of stresses induced by changes in said temperature and pressure measurements, and for generating signals representative of the actual $RT_{ndt}$ across the vessel wall at said selected location; and means for comparing the actual $RT_{ndt}$ signal with the required $RT_{ndt}$ signal for flaw initiation to generate a representation of the difference in value between the actual and required $RT_{ndt}$ signals.

* * * * *